350-96.1 SR
XR 3,447,438 385 H

June 3, 1969 H. KAÜFER ET AL 3,447,438

OPTICAL SYSTEM HAVING AT LEAST TWO LENTICULAR SCREENS

Filed Nov. 17, 1965

INVENTOR.
HELMUT KÄUFER
ERICH BURGER
HANS-PETER HUBER
BY Michael S. Striker
Attorney

3447438
OR IN 354/229

INVENTOR.
BY HELMUT KÄUFER
ERICH BURGER
HANS-PETER HUBER

OPTICAL SYSTEM HAVING AT LEAST TWO LENTICULAR SCREENS

Filed Nov. 17, 1965 Sheet 3 of 8

INVENTOR.
BY HELMUT KÄUFER
ERICH BURGER
HANS-PETER HUBER

OPTICAL SYSTEM HAVING AT LEAST TWO LENTICULAR SCREENS

Filed Nov. 17, 1965

INVENTOR.
HELMUT KÄUFER
ERICH BURGER
HANS-PETER HUBER
BY

INVENTOR.
HELMUT KÄUFER
ERICH BURGER
HANS-PETER HUBER
BY
[signature]
Attorney

INVENTOR.
HELMUT KÄUFER
ERICH BURGER
HANS-PETER HUBER
BY
Attorney

INVENTOR.
HELMUT KÄUFER
ERICH BURGER
HANS-PETER HUBER
BY

INVENTOR.
HELMUT KÄUFER
ERICH BURGER
HANS-PETER HUBER
BY 3,447,438

OPTICAL SYSTEM HAVING AT LEAST TWO LENTICULAR SCREENS

Helmut Kaüfer, Metzkausen uber Mettmann, Erich Burger, Unterhaching, Munich, and Hans-Peter Huber, Munich, Germany, assignors to Agfa-Gevaert Aktiengesellschaft, Leverkusen, Germany Filed Nov. 17, 1965, Ser. No. 508,244
Claims priority, application Germany, Nov. 20, 1964, A 47,648
Int. Cl. G03b *37/00;* G02b *27/00, 3/00*
U.S. Cl. 95—15 31 Claims

ABSTRACT OF THE DISCLOSURE

An optical system which has first and second lenticular plates consisting of first and second lenticular lens elements, pairs of which are aligned along axes intersecting in a projection center, and form of each object point coinciding image points in an image plane spaced from the projection center the total focal distance of the optical system.

The present invention relates to a lenticular optical system, and more particularly to a lenticular optical system including at least two lenticular screens composed of lens elements arranged in the same pattern.

In known optical systems, aberrations and differences in illumination can be maintained within tolerable limits only within a limited image angle. In view of this fact, optical devices are designed so that the focal distance of the objective is not substantially smaller than the diagonal of the image. This results in a minimum total length of optical devices, which cannot be further reduced when conventional objectives are employed.

In order to reduce the cost of optical systems, glass lenses have been replaced by lenses made of a synthetic plastic material. However, high quality lenses can be made of plastic material only if the lenses are small so that during the manufacture of the flow paths between the various zones of the lens are substantially equal.

It has also been proposed to form the image of a source of illumination at the same size on a projection screen by combining a plurality of images produced by a plurality of groups of small lens elements, the lens elements being arranged, for example, in crossing rows and forming a lenticular screen.

In known optical devices using lenticular screens, a total continuous image can be produced by the groups of lens elements only if the image distance is equal to the object distance. Nevertheless, on several areas of the picture, multiple images of the same object points are produced due to the fact that each lens element of one lenticular screen permits rays of light to pass to several lens elements of another lenticular screen. Apparatus according to the prior art does not permit the precise superimposition of several image points produced by several groups of lens elements of the same object point.

It is one object of the invention to overcome the disadvantages of lenticular optical systems according to the prior art, and to provide a lenticular optical system of high optical quality which can be inexpensively manufactured.

Another object of the invention is to provide a lenticular optical system permitting a reduction of the total length of optical apparatus as compared with conventional constructions.

Another object of the invention is to provide a lenticular optical system in which several groups or pairs of lens elements form superimposed image points of the same object points.

Another object of the invention is to provide a lenticular optical system in which the light rays passing through a pair of associated lens elements of a pair of lenticular screens, do not impinge other lens elements of the lenticular screens.

Another object of the invention is to provide a lenticular optical system producing an image of different size than the object.

Another object of the invention is to provide a lenticular optical system producing a substantially uniformly illuminated image.

Another object of the invention is to provide cameras, projectors, field glasses, and other optical apparatus with lenticular optical systems replacing standard objectives.

Another object of the invention is to provide optical apparatus with an inexpensively manufactured lenticular optical system made of a synthetic plastic material.

Another object of the invention is to provide a high power optical system constructed of lenticular screens.

With these objects in view, one embodiment of the invention comprises at least two lenticular means which may be straight or curved plates or screens arranged parallel to each other. One lenticular means is located in front and is composed of a plurality of first lens elements spaced a first distance from each other in longitudinal and transverse directions, and the other lenticular means is composed of a plurality of second lens elements spaced a second different distance from each other, and being arranged in the same pattern as the first lens elements. Pairs of first and second lens elements cooperate optically with each other to guide rays of light from an object to an image plane. In accordance with the invention, the first and second distances, which are characteristic of the pattern of the two lenticular means, are in such a ratio that all pairs of associated first and second lens elements form of each object point, coinciding image points located in a common focal plane, which is the focal plane of the entire optical system. An optical system constructed in this manner, will produce a uniform continuous image for any object distance and image distance. The first and second distances, representing the pitch of the respective lenticular screen, are different and selected and calculated so that the desired coinciding of the image points produced by several pairs of first and second lens elements of the same object point is obtained.

Due to the fact that the image points of the same object point coincide in the focal plane of the entire optical system, several pairs or groups of lens elements can be used for producing an image of the same object point, so that each pair or group of lens elements need to have only a fraction of the ratio of lens aperture of the total power of the lenticular optical system. The image angle illuminated by one pair of lens elements, can be made smaller than the image angle of the entire lenticular optical system. Due to the fact that the image is formed by a plurality of pairs or groups of lens elements having small image angles and small ratios of aperture, it is possible to construct an optical system of high power of inexpensively manufactured lenticular screens, which may be made of synthetic plastic material.

Due to the substantial overlapping of the image sections of the several groups of lens elements, a very uniform illumination is obtained. Preferably, light guiding means are provided for separating the bundles of rays passing through different groups or pairs of lens elements, so that secondary images, which would disturb the continuous uniform total image and the optical contrast, are avoided.

A lenticular optical system according to the invention can be constructed so that all pairs of lens elements have a common center of projection, whose position on the optical axis can be determined by suitably selecting the optical properties of the lenticular system.

Particularly advantageous conditions regarding the spatial arrangement and the guiding of the light rays are obtained by lenticular optical systems having a lenticular screen of positive power in front, and a lenticular screen of negative power in the rear so that the center of projection is formed between the optical system and the object which is being imaged. Another preferred embodiment of the invention has lenticular screens of positive power of refraction located in front and in the rear, and forming a center of projection located rearwardly of the image plane, as viewed from the object plane.

In both embodiments, lenticular optical systems can be constructed in which the total distance between the image plane and the lenticular screen in front is substantially smaller than the effective focal length of the system. This permits the reduction of the size of optical apparatus, suuh as photographic cameras, projection apparatus, viewers, and field glasses.

Both embodiments of the invention can also be used for panoramic cameras and projectors in which event lenticular screens are disposed along circles concentric with the center of projection. The panoramic angle of a system using a positive and a negative lenticular screen is almost 180°, and in a system using two positive lenticular screens, the panoramic angle may be 360°.

A projection apparatus according to the present invention using, for example, two positive lenticular screens, is provided with a source of light in the center of projection, permitting projection without a condenser, not only of planar film, but also of film curved over an angle of 180° or 360° for producing panoramic projections. A transparent transport drum for the film is advantageously used for a panoramic projector in accordance with the present invention, with the source of light located in the transparent transport drum.

The two lenticular means or screens according to the present invention, are advantageously combined with an additional lenticular screen located in the intermediate object plane of the front lenticular screen, and composed of lens elements arranged in the same pattern as the lens element of the lenticular screens in front and rear of the system. Furthermore, another lenticular screen may be arranged in front and serve as an ocular. The pattern of the lens element of the several lenticular screens is the same, so that a group consisting of one lens element of each lenticular screen cooperates to guide a bundle of rays. The focal length, aperture, and spacing of the lens elements and groups of lens elements is selected in accordance with the image section to be formed by the respective group. Particularly, in the system employing positive lenticular screens in front and rear, where the area of the lenticular screens is greater than the area of the formed picture due to the fact that the center of projection is located behind the image plane so that the image angles of the respective groups of lens elements become correspondingly smaller, the diminution of illumination along the marginal areas and image curvature, which are unavoidable in conventional optical systems, can be compensated in each area. In the same manner, distortion occurring in the marginal areas of the picture frame, can be eliminated by an additional continuous variation of the spacing between the lens elements of the lenticular screens. As a result, the image angle of the lenticular optical system can be substantially increased as compared with standard optical systems, without exceeding the limits of permissible magnitude of image defects so that the above explained reduction of the total length of an optical apparatus can be obtained. For example, it is possible to construct a projection apparatus for photographic slides or films with an image angle between 90° and 110° having the dimensions of a television set.

Correction of intercept length and illumination of sections, renders possible projection between parallel planes which are slanted to the optical axis of the system. For example, a film can be projected in rooms designed for another purpose, and panoramic projection from a point far above the level of the viewer is possible. Another advantage is that several adjacent pictures can be superimposed with sufficient sharpness without interposition of mirrors and other optical deflectors. This characteristic of the invention opens further possibilities in other fields, for example color selection in color television apparatus, in color selection testing apparatus, and for the superimposing of trick pictures.

In accordance with another feature of the invention, the two refractive surfaces of each lens element of a lenticular means may be provided on two lens elements of two lenticular screens, and corrected in the usual manner of a single lens. Furthermore, the lenticular means may be made of material having different power of refraction and different dispersive indices. At least one of the image forming surfaces of a group of lens elements, may be constructed as an aspheric surface of a synthetic plastic material.

In the simplest solution, two optical refractive surfaces are arranged on opposite sides of the lenticular screen so that the lens element has a favorable shape, and is, for example, a planoconvex lens, or a thick meniscus which, assuming a sufficiently small ratio of aperture, and a suitable pattern and spacing of the lens elements, produces an image of a quality sufficient for a great number of optical apparatus.

If chromic defects are to be corrected to a certain degree, the system providing a positive lenticular means and a negative lenticular means, affords the possibility to make the two lenticular means of transparent synthetic plastic materials having different coefficients of dispersion.

For greater ratios of aperture, or for higher requirements regarding the optical quality, each lenticular means includes several lenticular screens consisting of materials having different indices of refraction and dispersion, and synthetic plastic materials having such properties are available in the trade.

Since the refractive surfaces of a lenticular means can be oriented in relation to an axis parallel to the optical axis, irrespective of the pattern and spacing of the lens elements explained above, in this manner all known computed types of objectives can be used in the lenticular optical system of the invention, reduced in size to lens elements of lenticular screens, so that they can be easily manufactured of synthetic plastic material, and have smaller ratios of aperture and image angle than a corresponding single objective.

Evidently it is necessary to prevent that the gain in optical quality obtained by using a plurality of groups of small lens elements, is not lost by superimposition of the respectively produced image sections. This requires particularly maintaining within exact tolerances the ratio between the distances of the lens elements of the two lenticular means, and inaccuracies in the spacings of lens elements must not exceed the magnitude of permissible image defects, which is the rule of value of about 0.02 to 0.03 mm. Due to the fact that the absolute value of the spacings between adjacent lens elements is small, and considering the fact that not the absolute value but only the ratio of the distances between the lens elements of the two lenticular means is of importance, lenticular means within the desired tolerances can be manufactured without difficulties of synthetic plastic materials at the present state of the art. A relative displacement of the lenticular means has no influence of the joining of the image sections, and has an influence on the quality of the resulting picture only if the correction of defects has been accomplished by more than one lenticular screen.

In the lenticular optical system employing two positive lenticular means in front and in rear, it is advantageous to provide an additional lenticular means in the intermediate image plane of the front lenticular means so that the lens elements of the additional lenticular means have the effect of field lenses. These lens elements have to be arranged along lines connecting associated pairs of first and second lens elements of the first and rear lenticular means so that the lens elements of the intermediate lenticular means form images of the lens elements of the front and rear lenticular means. The thus provided field lenses increase the power of the optical system, since a greater number of groups of lens elements cooperate to form an image of an object point. Furthermore, the correction of the optical system, particularly regarding distortion, is facilitated because the lens elements in the second lenticular plane are centrically impinged.

In the embodiment of the invention employed two positive lenticular means in front and rear, it is advantageous to provide intermediate diaphragms provided with apertures arranged in the same pattern as the lens elements and permitting the continuous joining of image sections in the image plane corresponding to the final picture, wherein each section is produced by a group of associated lens elements of the several lenticular means, or by an integer multiple thereof. The apertures of the intermediate diaphragms are preferably geometrical figures, such as squares or hexagons, which can be joined to form a continuous surface.

By suitably designing and arranging the intermediate diaphragms in relation to the pattern of the lenticular means, the result can be obtained that every part of the final picture in the image plane is illuminated by exactly the same number of groups of lens elements, which is of particular importance if the optical system is designed, or if the aperture of the same has been at least temporarily reduced, so that each image point is associated with less than four groups or pairs of lens elements.

The aperture of the optical system can be reduced by diaphragm means which have a plurality of adjustable apertures arranged in the same pattern as the lens elements. In one embodiment, two diaphragm plates are provided with square openings, and the diaphragm plates are shiftable relative to each other between positions in which the openings of the two diaphragm plates overlap to different extents whereby the overlapping portions of the openings form apertures of different size, which are also square.

It is advantageous to reduce the aperture in such a manner that, as the speed of the optical system is reduced, also the number of the groups of lens elements participating in imaging one point is reduced so that the reduction of the aperture also results in an increase of the depth of field in the same manner as in a conventional objective. For this purpose, coupled diaphragms can be provided in the diaphragm plane of one or both of the lenticular means, as well as in the intermediate image plane. The shifting of the intermediate diaphragms should be preferably in steps, which can be accomplished by stepped control cams.

However, in many cases it is sufficient to provide diaphragm apertures only in the region of the diaphragm plane of the second lenticular plane, preferably between the same and the intermediate image plane for confining continuously and simultaneously the image forming bundles of rays, and the image field sections of the respective groups of lens elements of the several lenticular means.

A shutter for the optical system of the invention preferably comprises a stationary and a removable shutter plate, both formed with openings arranged in the same pattern as the lens elements so that by shifting of the movable shutter plate, the openings can be placed in registering and in shutting positions. The solid portions of the stationary shutter diaphragm between the openings of the same, must be sufficiently wide to close the openings in the movable shutter plate when the shutter is closed. A pair of diaphragm plates movable for reducing the aperture of the optical system, as explained above, may be used in combination with a movable shutter plate. The shutter plate is advantageously moved in a translatory movement by a pair of cranks. Due to the small distance of movement of the movable shutter plate, very high speeds can be obtained. A regulation of the speed of the shutter plate can be obtained by known delay means which engage the movable shutter plate in the open position of the shutter and hold the same open for a desired time period. If the movable shutter plate has one more row of openings than the stationary shutter plate, successive exposures can be obtained by continuously rotating the cranks in the same direction without the necessity of cocking the shutter, as in conventional arrangements.

For a particular ratio between the distances of the lens elements of the lenticular means, as explained above, the object distance is determined. By variation of the distance between the two lenticular means, and of the distance between the image plane on a photographic film, for example, from the rear lenticular means, the optical system can be adjusted to form a sharp image of an object at any object distance, while maintaining the predetermined ratio. The sharpness of the picture, and the superimposition of the several image sections produced by different groups of lens elements, is precisely maintained in adjusted positions of the optical system. The movement of the lenticular means along the optical axis can be obtained in the usual manner by a threaded ring, or by cams. However, since in the optical system of the invention due to the provision of lenticular screens, and due to the small aperture ratio, the adjustment of the plane of sharpness is of no particular consequence, it is preferred to adjust only the cover plane by variation of the length of the optical apparatus, or of the distance of the image plane from the rear lenticular plane.

The calculation of several optical systems according to the present invention has shown, that the displacement of the cover plane can be substantially smaller than the displacement of the plane of sharpness determined by the known optical laws controlling the formation of images. Therefore, it appears to be possible to use the lenticular optical system of the invention in photographic apparatus for the so-called "fixed focus" setting, particularly since the reduction of sharpness occurring at the limits of the distances, produces a real soft focus effect due to the smallness of the respective circles of confusion.

A variation of the length of the optical apparatus, or of the distance of the image plane from the rear lenticular plane, varies the focal distance and the scale of the image, as in conventional optical systems. A sharp focussing to different object distances, without a change of the image scale, or a variation of the focal distance in a manner of a vario objective, while maintaining the sharp focus, can be obtained if the lenticular optical system of the invention is constructed of three lenticular means, and if the spacing $d_0$, the object distance $a_0$, and the focal length $f_0$ of the lenticular means located in the rear, and the distance $\delta_0$ of the image sections produced by lenticular means preceding in the direction of the passage of rays follows the condition $$\frac{\delta_0}{d_0}=\frac{a_0}{f_0}$$

The displacement of the image sections due to the variation of the object distance, or of the focal length of the system, can then be compensated by a variation of the object distance $a_0$. If applied to field glasses in which the image distance of the ocular is infinite, the distance between the image sections is equal to the distance between the lens elements.

If in accordance with another aspect of the invention, the intermediate images produced by a lenticular system are projected at a distance from each other which is a fraction of the diameter of a standard ocular of field glasses, and if the ocular is a lenticular means having the same number of lens elements, a unitary continuous picture is produced at an infinite distance.

The focal length of the ocular lens elements can be reduced corresponding to the smaller diameter of the ocular lens elements, while maintaining the aperture ratio selected in view of the required good optical properties of the image. Thereby, the total focal length of the optical system, and its length along the optical axis, are reduced to the same degree since they are determined by the scale of the image. In this manner, without the use of expensive prism arrangements, a remarkable reduction of the size of field glasses can be obtained. Due to the joining of the image section forwardly of the ocular lenticular means, the available area of the ocular is substantially better utilized than in constructions according to the prior art.

Light guiding means for separating the bundles of rays of the respective lens elements are also necessary between the image plane of the ocular, and the ocular lenticular means, which must be very precise due to the small diameter of the ocular lens elements.

Such light guiding means are also required between the main lenticular means of the system, and must have passages for the bundles of rays which have different inclinations to the optical axis, and different cross-sectional areas. It is necessary that only minimum stray light is produced by the light guiding means, since otherwise the contrast of the image would be detrimentally affected. In one embodiment, thin perforated metal sheets are provided with apertures arranged in the pattern of the lens elements and spaced from each other by spacing members consisting of synthetic plastic material, the openings in the spacing members being larger than the openings in the diaphragm sheets through which the light is guided. Only the very thin edges of the perforated diaphragm sheets, and not the wider edges of the spacing members are impinged by light. If the distances between lens elements are small, it is advantageous to make a lenticular means, particularly for an ocular, of glass fiber rods which, in contrast to known fiber optical elements, have at least one end face formed as a preferably spherical refractive surface, and which are dulled or frosted on their lateral surfaces.

A particularly accurate matching of the light guiding means with the actual path of the rays can be obtained in another modified arrangement of the invention in which the light guiding means consists of a glass which is sensitive to light, and which permits to develop by heat treatment portions of the glass impinged by light to become less transparent and dull. Those portions of a glass plate which are not permeated by bundles of light are thus made light impermeable whereby the light is accurately guided. It is also possible to remove the portions of the treated glass which are, not dulled in a manner described, for example, in the periodical "International Electronics" in an article "Special Glasses for Electronic Applications" which appeared in the issue of January 1964.

An illumination corresponding to the spatial shape of the path of the bundles of rays or of the intermediate portions, can be applied to the glass body in a simple manner by means of an optical system corresponding to the lenticular system of the invention with collimator lenses which project into the illuminating system a light spot or shadow spot visible at an angle within the image field angle at an apparently infinite distance. If a thus treated light guiding glass plate has the passages for the light bundles formed as holes by removing the corresponding glass portions, the surface of the glass plates can be later covered with a layer of lacquer.

It is advantageous to cover the outer surface of the outermost lenticular means by an optically neutral cover glass plate. This is particularly advisable for lenticular means made of synthetic plastic material whose surface is more easily damaged than the surface of glass lenses. The cover glass is mounted in a frame of the housing and constitutes a smooth closure preventing the entry of dirt or moisture into the housing of the lenticular optical system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
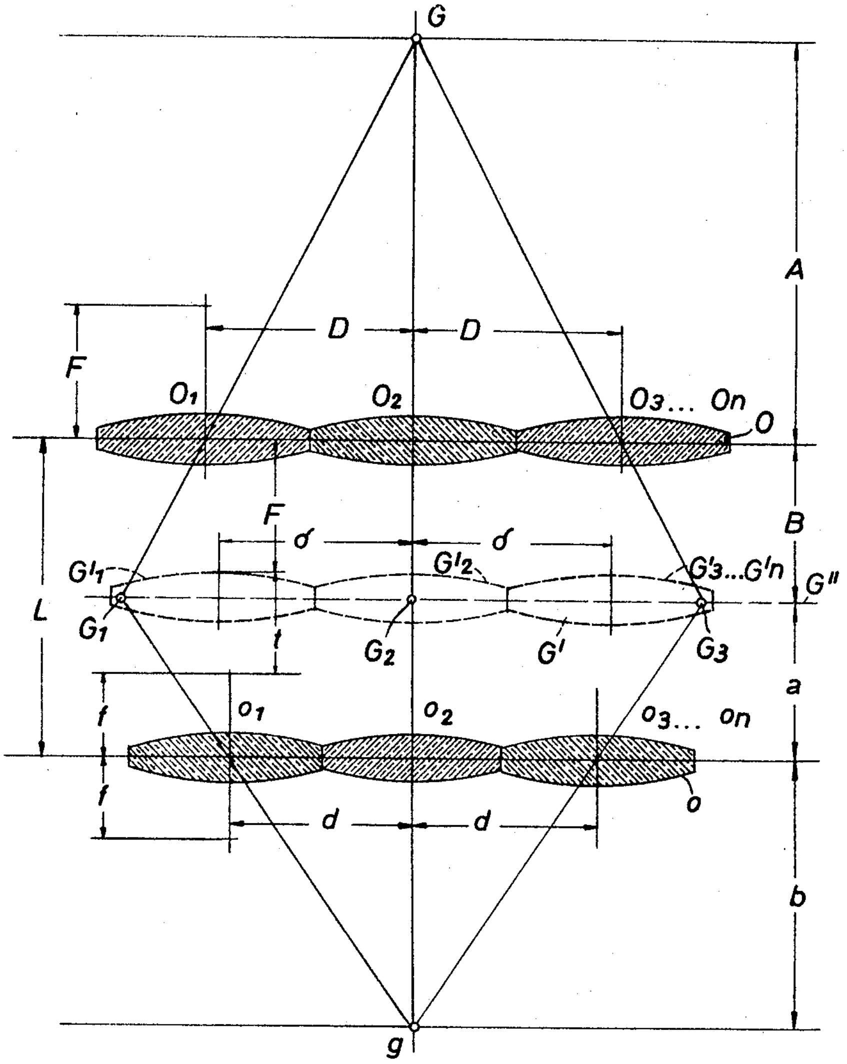
FIG. 1 is a schematic diagram illustrating the optical conditions of a lenticular lens system in accordance with the invention.

Referring now to the drawings, and more particularly to FIG. 1, an optical lenticular system comprises two lenticular means O and $o$, shown to be plates or screens composed of a plurality of adjacent lens elements which may be arranged along parallel rows, and if desired also along parallel columns. Lenticular means O is located in front, and is composed of lens elements $O_1$, $O_2$, $O_3$ to $O_n$, only three lens elements being shown. The other lenticular means $o$ is composed of lens elements $o_1$, $o_2$, $o_3$ to $o_n$. Pairs of lens elements of lenticular means O and $o$ cooperate with each other, as shown for lens elements $O_1$ and $o_1$, $O_3$ and $o_3$.

The lens elements of lenticular means O have all the same focal distance F, and the lens elements of lenticular means $o$ have all the same focal distance $f$. The lens elements of lenticular means O are spaced from each other equal distances D, and the lens elements of lenticular means $o$ are spaced equal distances $d$. The principle points of lenticular means O and $o$ are spaced the distance L, and the object plane represented by the object point G is spaced the object distance A from lenticular means O. The image plane, represented by the image point $g$, is spaced the image distance $b$ from lenticular means $o$ which has an object distance $a$. The image distance B of lenticular means O, and the object distance $a$ define an intermediate image plane G''.

Lenticular means G′ composed of a plurality of lens elements constituting field lenses may be provided in the intermediate image plane G″ as shown in broken lines. The spacing between the optical axes of the field lens elements $G'_1$, $G'_2$, $G'_3$ must correspond to the distances D and $d$.

One condition for producing a single image by two lenticular elements is that the focal distance of each pair of lens elements, and of all pairs of lens elements is the same and correspond to the focal distance desired for the lenticular system. Assuming that is the distance between the focal points of the two lenticular means, the combined focal length $F_c$ can be mathematically expressed as follows:

(1) $$F_c=\frac{-f.F}{t}$$

The distance L between confronting principle points of the lenticular means is obtained by the following equation:

(2) $$L=F+f+t$$

It is also necessary that all pairs of lens elements form of the same object point coinciding image points.

As far as superimposing of the image points is concerned, the imaging of the object point G in the intermediate image points $G_1$, $G_2$, $G_3$, and in the single image point $g$ is determined by the center rays. From the triangles formed by the center rays, the following equations can be derived, which are valid for any pair of lens elements, and are also applicable to systems having a finite distance between the principle points.

(3) $$\frac{D}{d}=\frac{A(a+b)}{b(A+B)}$$

(4) $$b=\frac{daA}{D(A+B)-dA}$$

The image equations for the lenticular means O and $o$ are, respectively, (5) $$B=\frac{AF}{A-F}$$

(5a) $$b=\frac{a\cdot f}{a-f}$$

and since (6) $$a=L-B$$

the image distance $b$ at which the pairs of lens elements produce a sharp image, can be expressed by the following equation:

(7) $$b=\frac{a\cdot f}{a-f}=\frac{(L-B)\cdot f}{L-B-f}=\frac{\left(L-\frac{A\cdot F}{A-F}\right)\cdot f}{L-\frac{A\cdot F}{A-F}-f}$$

From Equations 4 and 7 follows:

(8) $$L=\frac{fD+Fd}{d\left(1-\frac{F}{A}\right)}$$

Assuming $A\rightarrow\infty$, Equation 8 can be transformed into (9) $$L_{A\rightarrow\infty}=F+\frac{fD}{d}$$

The ratio $D/d$ of the distances between the lens elements of the two lenticular means O and $o$ can be found Equations 8 and 9, as follows:

(10) $$\frac{D}{d}=\frac{L}{f}\left(1-\frac{F}{A}\right)-\frac{F}{f}$$

(11) $$\frac{D}{d}\text{ for }A\rightarrow\infty=\frac{1}{f}(L-F)=\frac{a}{f}$$

considering that, for $A\rightarrow\infty$,

(12) $$a=L-F$$

Equation 10 determines the ratio of the distances D and $d$ between adjacent lens elements for producing in the focal plane of the system, a single image of the object by the deflection of rays by each pair of lens elements of the lenticular means O and $o$.

The above equations are valid for lenticular optical systems in which both lens elements of each pair of lens elements have positive power of refraction, for example in periscope-like systems, as well as for optical systems in which positive and negative optical elements are combined, for example for tele objective systems. In the latter case, the resepctive values have to be entered into the equations with a plus or minus sign, as required.

It is necessary that each lens element $o_n$ receives light only from the respective associated lens element $O_n$ in order to produce a single image point of each object point. This condition can be obtained by light guiding means, such as honeycomb diaphragms, field lens elements $G'_n$, fiber optical elements, and similar arrangements, unless the desired accurate imaging is obtained by the spatial relationship of the lens elements.

Figures 2, 3:
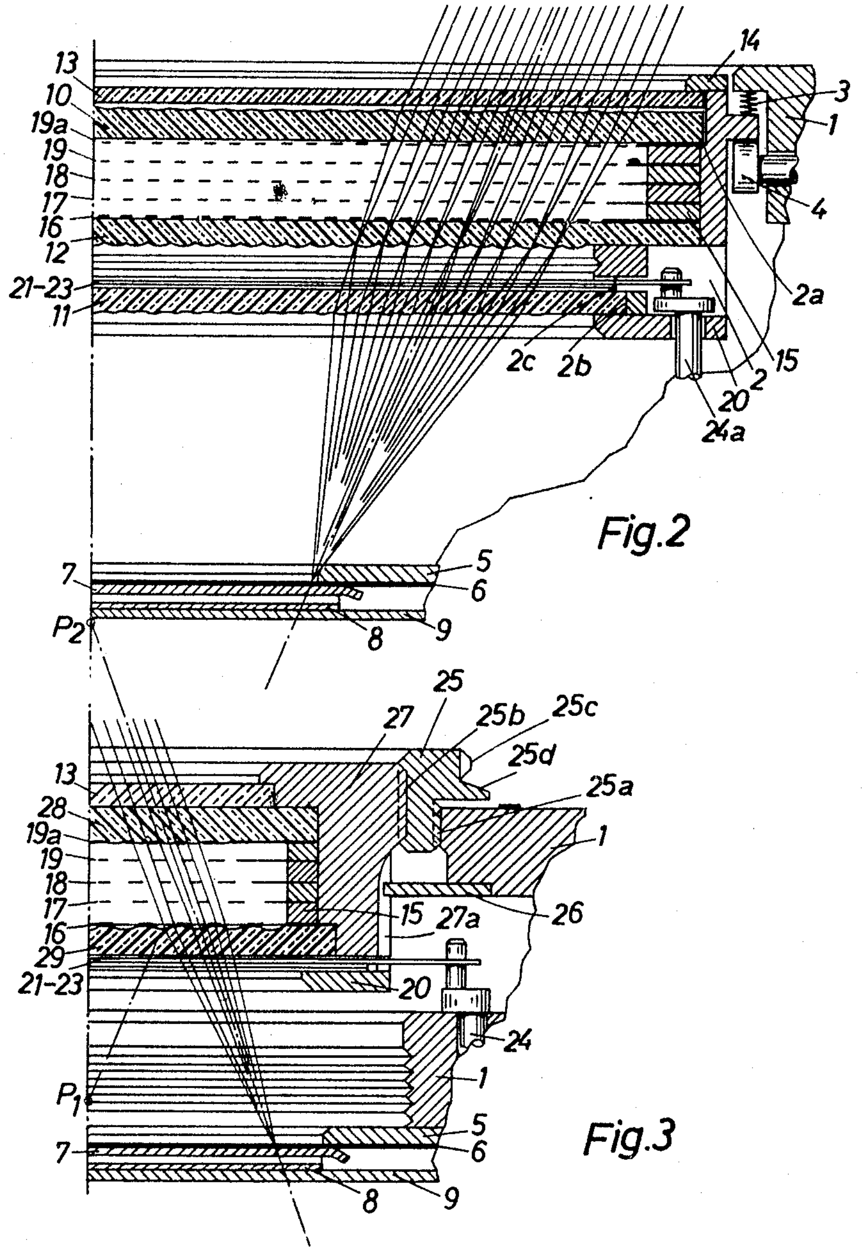
FIG. 2 is a fragmentary axial sectional view illustrating a first embodiment of the invention including a plurality of lenticular means of positive power of refraction.
FIG. 3 is a fragmentary axial sectional view illustrating another embodiment of the invention having two lenticular means of positive and negative power of refraction, respectively.

FIG. 2 illustrates a photographic camera embodying the lenticular optical system according to the invention. A rectangular objective frame 2 is mounted in a camera housing 1 and is pressed by springs 3 against four eccentric cams 4 which determine the distance between the objective frame 2, and the lenticular optical system supported thereby, and the distance from the latter to the light senstive surface of a film 6 which abuts a support plate 5. Eccentric cams 4 may be coupled to each other by a frame, not shown, having a rack portion meshing with a gear on a knob provided with graduations indicating distances in the usual manner. A pressure plate 7 is urged by a spring 8 abutting the rear wall 9 of the housing to press film 6 against support plate 5.

Objective frame 2 supports a lenticular optical system including a first plate-shaped lenticular means 10 whose lens elements are spaced equal distances D which are, for example, 2 mm. and have a focal distance F, for example 10 mm., and a second plate-shaped lenticular means 11 whose lens elements are spaced distances $d$, for example 1.6 mm., and have a focal distance $f$ of, for example 4 mm. The two lenticular plates or screens 10, 11 are spaced from each other a distance L of preferably 15 mm., measured from the internal perspective center or principle point. The above measurements correspond to the above discussed equations, so that a sharp image is produced on the sensitive surface of film 6 by the lenticular system. The focal length of the lenticular system is 40 mm.

Axes connecting the lens elements of each pair, intersect in a projection center $P_1$ located rearwardly of the image plane, spaced from the same the total focal distance of the optical system. The total height of the camera is substantially equal to the total focal distance. Projection center $P_1$ of the lenticular system shown in FIG. 2 is covered by FIG. 3.

In the embodiment of FIG. 2, a third plate-shaped lenticular means 12 is arranged intermediate lenticular means 10 and 11, and composed of lens elements acting as field lenses. The distances between the optical axes of lens elements $G'_1$ to $G'_n$ are 1.73 mm., and the focal length of each lens elements $G'_n$ is 3.3 mm. so that the field lens elements $G'_n$ are disposed on the lines connecting the lens elements of the front and rear lenticular means 10 and 11, and image the same on each other.

Lenticular means 103, and a neutral planar glass cover plate 13 are held by a frame 14 on a shoulder *2a* of frame 2. Between lenticular means 10 and lenticular means 12, spacing members 15, consisting of a synthetic material are located, and apertured diaphragms 16 to *19a* are located between the spacing members and lenticular means 10 and 12, respectively. The diaphragms are preferably made of thin metal sheet material of a thickness of between 0.03 to 0.05 mm., and being blackened.

The apertures of the diaphragms are arranged in the same pattern as the lens elements, so that each series of registering apertures of diaphragms 16 to *19a* permits the passage of rays only between associated lens elements. In this manner, the rays of each pair of lens elements of lenticular means 10 and 11, and of the respective associated lens element of lenticular means 12, cannot enter the region of the adjacent three cooperating lens elements. This effect can be obtained even if the distances between the bundles of rays are small, by reducing the distances between the several apertured diaphragms. In order to obtain a precise fit, the front lenticular means 10 is mounted on shoulder *2a* of objective frame 2, and a resilient frame, not shown, abuts the diaphragm to prevent rattling of the same.

The rear lenticular means 11 is located in a frame portion *2b* of frame 2 and held in position by a frame 20 which is attached by screws, not shown. Between lenticular means 11 and another frame abutting lenticular means 12, a pair of apertured diaphragms 22, 23, and an apertured shutter plate 21 are arranged. Shutter plate 21 has projections 21*a*, 21*b*, see FIG. 5, connected with cranks 24*a*, 24*b* so that turning of the crank causes displacement of shutter plate 21 so that the apertures in the shutter plate and in the diaphragm can be placed in registering positions permitting the passage of light to film 6, as will be explained hereinafter. It is also possible to mount the apertured diaphragm in the same manner as described for shutter plate 21 to permit an adjustment of the diaphragms in relation to the lens elements.

As is apparent from the paths of the ray in FIG. 2, nine times nine, that is eightly-one lens elements may participate at the center, as well as in the peripheral portions of the image field to image a point. Assuming that the lens elements of the front lenticular means 10 are masked off by lacquer or by another perforated diaphagm, to an average diameter of 1.25 mm. in order to provide a possibility for correcting the brightness in the respective areas by further reducing the aperture of the inner lens elements, and increasing the aperture of the outer lens elements, an average aperture of each group of associated lens elements of 1.25:40 or 1:32 results, which corresponds to a calculated aperture of the entire lenticular optical system of 1:2.4. In other words, the aperture of the optical system is 6.5 stops greater than the apertures of the individual cooperating groups of lens elements, and 2.5 stops greater than the aperture of the front lens elements, which is 1:8.

Even without field lenses, five times five, or twenty-five, pairs of lens elements of lenticular means 10 and 11 would result in an aperture of the system of 1:6.4, which is 4.5, or 0.5, stops more than the aperture of each pair, or of the front lens element, respectively.

The masked portions of the lens elements between the refrective surfaces do not participate in the forming of the image, and therefore it is advantageous to cool these outer portions of the lens elements during the manufacture of the lenticular means so that the material shrinks in these portions and the accuracy of the curvature of the refractive surfaces is substantially increased.

The embodiment of FIG. 3 is similar to the embodiment of FIG. 2, and corresponding elements are indicated by like reference numerals. A distance setting ring 25 having two different threads 25*a* and 25*b* has a knurled surface 25*c* and a graduated scale portion 25*d*. A mounting ring 27 which supports the lenticular optical system, can be displaced in axial direction by operation of ring 25, and is prevented from turning with the same by projection 26 on housing 1 engaging a groove 27*a* of mounting ring 27. By means of ring 25, the distance of the optical system from the photo-sensitive surface of film 6 can be adjusted.

The front lenticular means 28 has lens elements spaced a distance D of 2 mm., having a focal distance F of 10 mm., and an average diameter of 1.25 mm., as described with reference to lenticular means 10 in FIG. 2. However, the rear lenticular means 29 has lens elements spaced distances *d* of 2.66 mm., and having a focal distance *f* of −5 mm. The total focal focal length of the system is again 40 mm. The projection center $P_2$ is spaced the total focal distance of the optical system from the image plane provided by film 6. Projection point $P_2$ of the optical system of FIG. 3 is located forwardly of the optical system, while projection point $P_1$ of the optical system of FIG. 2 is located rearwardly of the image plane. Projection point $P_2$ of the optical system of FIG. 3 is partly covered by FIG. 2.

No intermediate lenticular means providing field lenses is provided in the embodiment of FIG. 3, and as described above with reference to a modification of the embodiment of FIG. 2, twenty-five pairs of lens elements of lenticular means 28 and 29 cooperate in forming the image of a point. However, the total height of the camera is only three-quarter of the total focal length, and the compact construction of a camera according to FIG. 3 is particularly desirable for cameras of the type producing directly after the exposure a finished print in camera, so that the camera must have dimensions corresponding to the format of the print.

Figure 4:
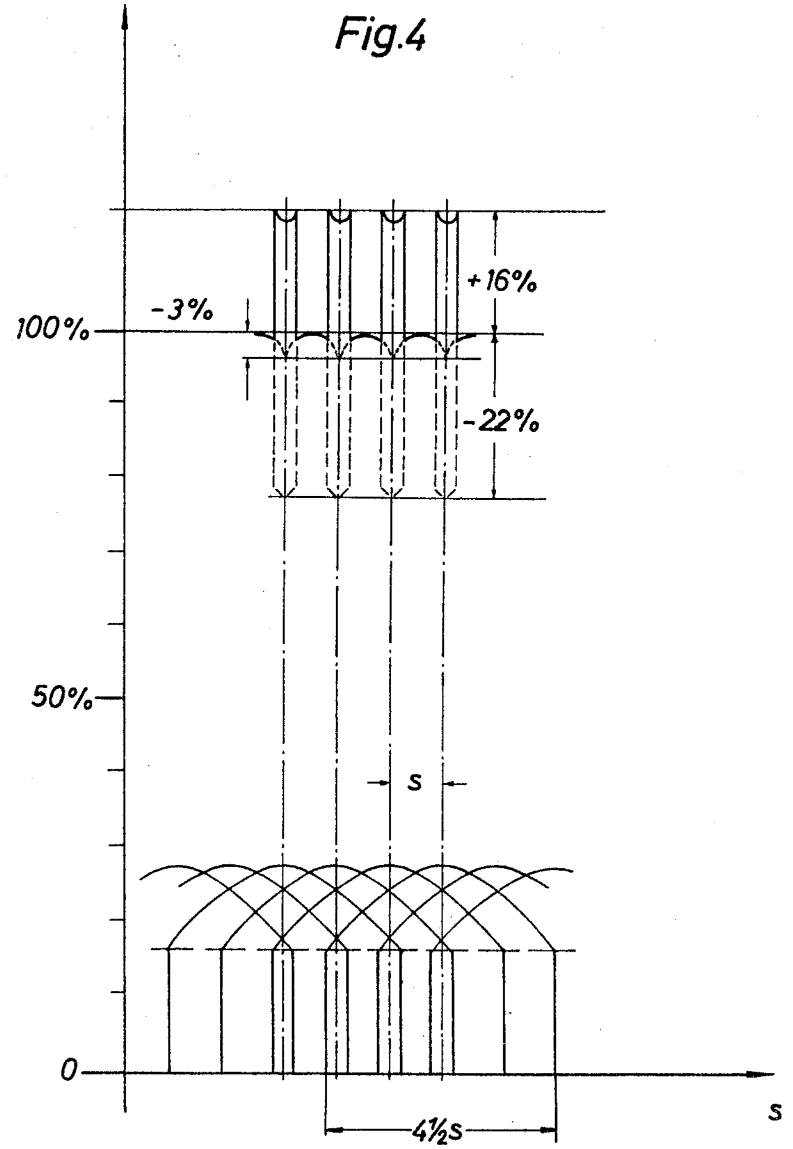
FIG. 4 is a diagram illustrating the distribution of light in a lenticular optical system according to the invention.

The diagram of FIG. 4 illustrates the quantity of light along distances *s* along the image plane corresponding to projections on the image plane of the distances between lens elements. It is assumed that the distribution of light for each lens element up to the angle to which the aperture was restricted, corresponds to the known condition $\cos_4$. The several light ray bundles overlap to such a small extent that the total amount of light deviates only −3% from a 100% maximum. Only at places in which aperture reductions overlap because they have a width of 4.5 spacings between lens elements, in other words not an integral multiple of the spacing, light peaks of 16% develop, since at these places not four, but five light ray bundles overlap.

For an aperture reduction corresponding to the width of 3.5 spacing distances, darker areas having a brightness reduced by 22% would develop. Fluctuations of this magnitude are not perceivable even for photo-sensitive layers for color photography, so that the appearance of the picture is not impaired. If fewer groups of lens elements cooperate to form an image point, the fluctuations of the brightness can be reduced by selecting suitable aperture reductions in view of the spacing between the lens elements so that they are not noticeable.

Figure 5:
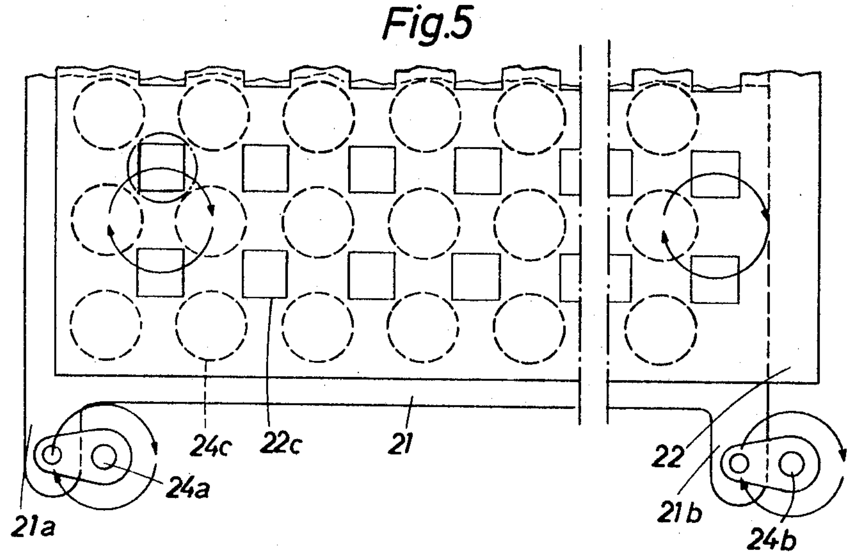
FIG. 5 is a fragmentary schematic elevation illustrating a shutter arrangement according to one embodiment.

Referring now to FIG. 5, which illustrates a shutter for the embodiments of FIGS. 2 and 3, cranks 24*a* and 24*b* engage two projecting portions 21*a* and 21*b* of a shutter plate 21. Shutter plate 21 has a circular opening 24*c* having a diameter corresponding to a bundle of rays passing through a lens element, and being spaced from each other corresponding to the pitch or spacing of the lens elements. The diaphragm plate 22 has corresponding, but square openings 22*c*. When cranks 24*a*, 24*b* are rotated by a shutter spring, not shown, at uniform rotary speed in the direction of the arrow, each point of the shutter plate 21 performs a translatory movement along a circular path indicated by two arrows. After each quarter turn of the crank, the openings 22*c* either register, or are spaced from the respective opening 24*c*, and consequently, a half turn corresponds to one opening and closing of the shutter. Cranks 24*a* and 24*b* are delayed in a known manner in the open position of the shutter in which openings 24*c* and 22*c* register, so that different exposure times are obtained. If shutter plate 21 has one more row of apertures in the direction of the opening positions of cranks 24*a* and 24*b* than the diaphragm plate 22, the half turns of the cranks causing opening and closing of the shutter can follow each other in uninterrupted succession.

Figure 6:
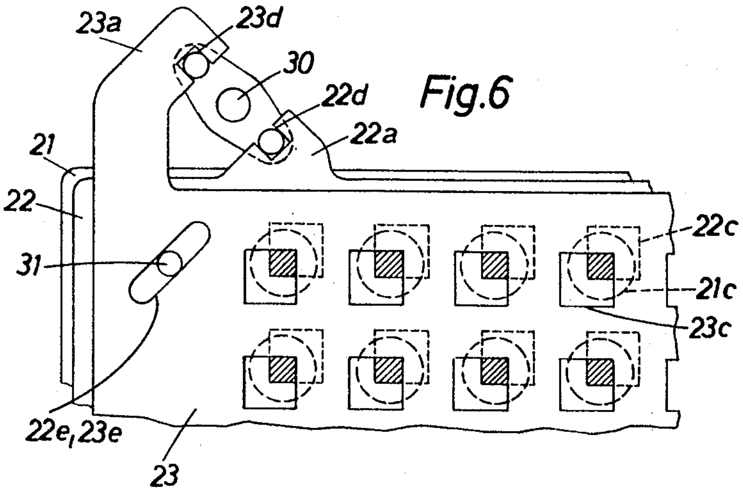
FIG. 6 is a fragmentary schematic elevation illustrating a shutter arrangement according to another embodiment of the invention.

FIG. 6 illustrates another shutter arrangement in which in addition to the diaphragm plate 22, another diaphragm plate 23 with square openings 23*c* is provided. Each diaphragm plate has at least two slots 22*e*, 23*e* extending parallel to a diagonal line and being guided on guide pins 31 secured to the housing. Diaphragm plate 22 has a projection 22*d* with a recess 22*d*, and diaphragm plate 23 has a projecting arm 23*a* with a recess 23*d*. A double armed lever 30 has pins at the ends thereof located in recesses 23*d* and 22*d* so that turning of lever 30 causes simultaneous displacement of the diaphragm plate 22 and 23 in the direction of the slots 22*e*, 23*e*. The square openings 22*c* and 23*c* overlap to different extents in the region of the circular opening 21*c* of the shutter plate 21 so that square openings of different size, indicating by hatching, are formed by the apertures 22*c* and 23*c*. Due to the symmetry of lever 30, the square openings increase and decrease their area concentric with the center of the circular openings 21*c* so that the aperture of the optical system can be adjusted.

Figure 7:
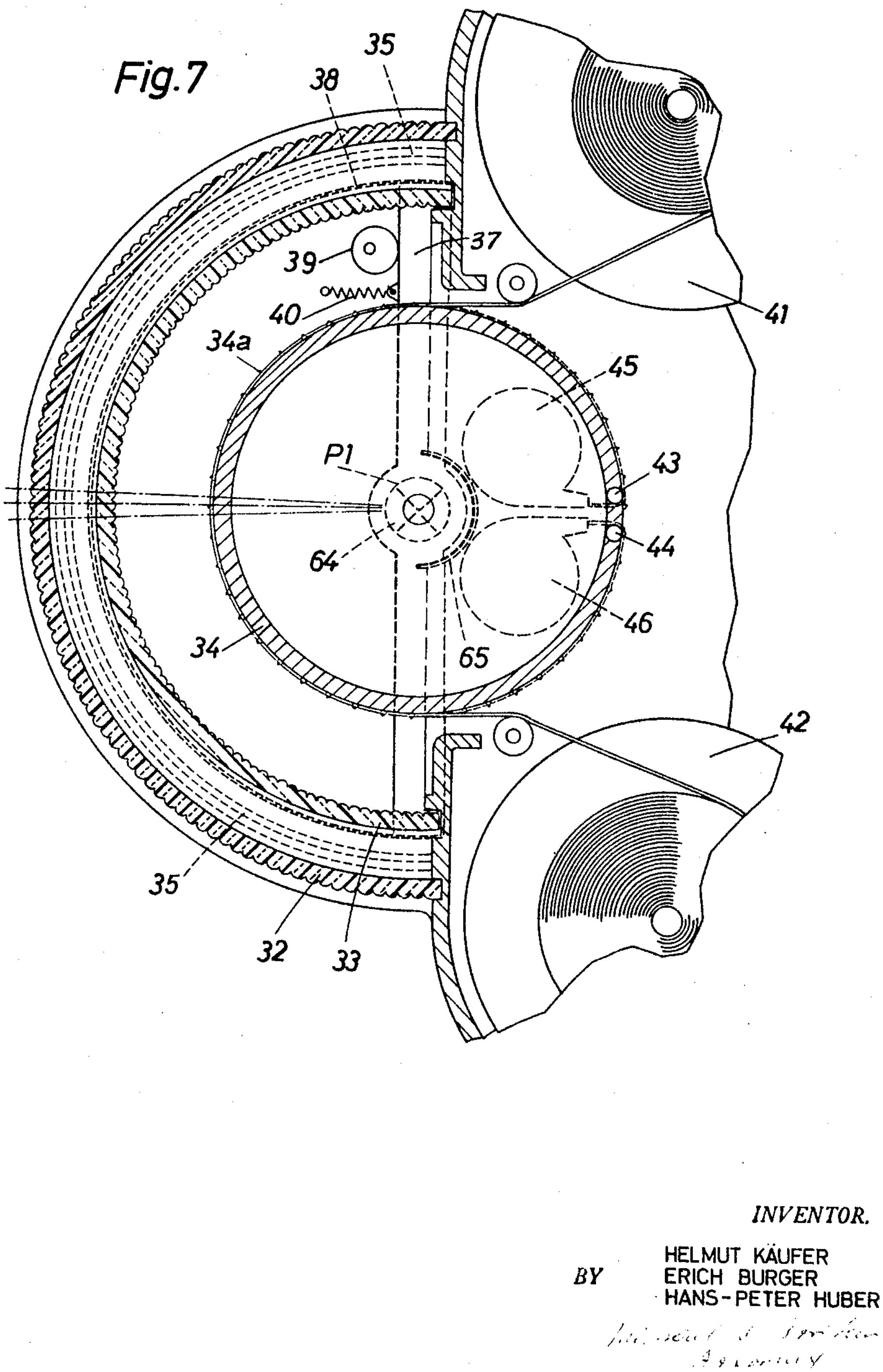
FIG. 7 is a fragmentary cross sectional view illustrating a panoramic camera according to another embodiment of the invention incorporating a lenticular optical system as shown in FIG. 2.

FIG. 7 illustrates a panoramic camera having a field angle of 180°, and being adapted for use as a still camera or as a motion picture camera. The optical lenticular system corresponds to the optical system described with reference to FIG. 2, but the lenticular means 32 and 33 are not planar, but are circular, the center of the circle being located at the projection center point $P_1$.

The equations discussed above are valid for the curved lenticular means of FIG. 7 if the image areas of the respective pairs or groups of lens elements are located along a polygon whose sides do not overlap. If the lens elements are sufficiently closely spaced from each other, a limited amount of overlapping of the image areas is permissible, and the image is projected onto a circular surface. In the embodiment of FIG. 7, the circular image surface is provided by a transporting cylinder 34 which is turnable about an axis passing through the projection center point $P_1$, and supports a film having perforations engaged by sprocket teeth 34*a* of transport drum 34. The film may be a 35 mm. film supplied from a let-off reel 41 and wound up on a take-up reel 42. Transporting drum 34 is turned half a revolution by a conventional stepping device which may be coupled to the shutter for cocking the same after each exposure.

Undesired overlapping of the image areas of adjacent pairs or groups of lens elements is prevented by a cylindrical slotted diaphragm 35, which is at the same time the stationary diaphragm plate of the shutter. The movable shutter element is a cylinder segment 38 mounted by means of levers 37 for rocking movement about the axis passing through projection center point $P_1$. A spring 40 urges lever 37 into engagement with an eccentric release member 39 so that by turning of the same, shutter member 38 turns a small angle corresponding to half the distance between two adjacent lens elements which is sufficient for permitting passage of light through associated lens elements.

A panoramic angle of 360° may be obtained by substituting a fixed cylinder for the transport durm 34. In this event, the film is supplied from a let-off reel 45 over small rollers 43 and is taken up by take-up reel 46 over a small roller 44, while sliding between rollers 43 and 44 over almost the entire circumference of the fixed cylinder.

The embodiment of FIG. 7 can be adapted with minor changes to serve as a projector. Transporting drum 34 is made of a transparent material, for example a synthetic plastic material, and a source of light 64 is arranged at the center point $P_1$ so that the light is reflected by semicircular reflector 65 through the film transported by the transparent drum 34 and through the lenticular optical system 32, 33, 34. No condenser is required. A projector as described above, is inexpensive and small.

The camera of FIG. 7 can also be provided with the lenticular optical system described with reference to FIG. 3. In this event, the maximum field angle is 180° since the rays on the object side of the system must pass through the projection center $P_1$. However, this modification can also be used as a projector.

Figure 8:
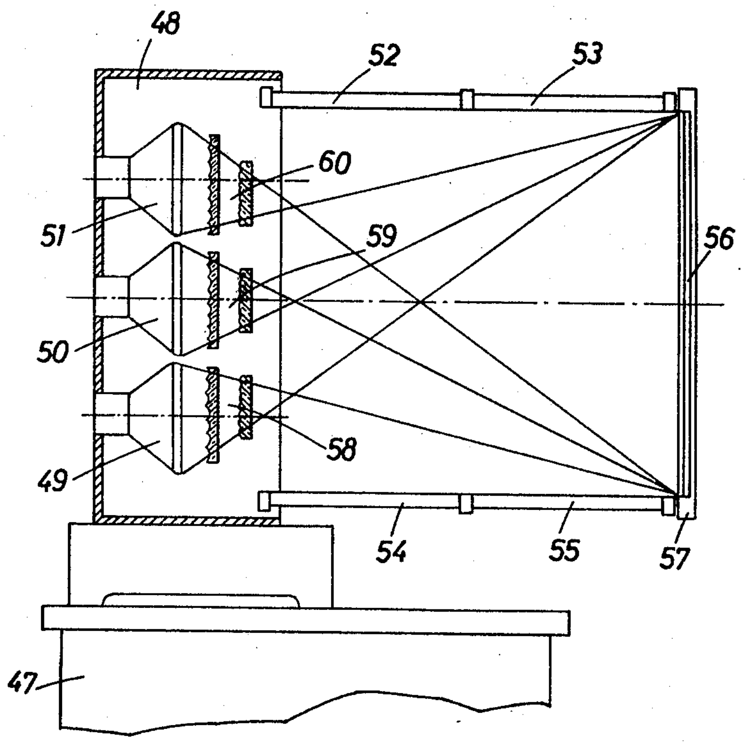
FIG. 8 is a fragmentary schematic vertical sectional view illustrating another embodiment of the invention for superimposing several images.

In the embodiment of FIG. 8, lenticular optical systems according to the present invention are used for color television. Three small television devices 49, 50, 51 are mounted in a housing 48 which is supported by a table 47. A picture screen 57 provided with a ground glass plate 56, is mounted by means of a lever system 52 to 55 on housing 48. An optical lenticular system 58 to 60 is mounted in front of each television device 49, 51. The lenticular systems 58 to 60 are of the type described with reference to FIG. 3, and include a lenticular screen of positive refractory power, and a lenticular screen of negative refractory power. The optical systems 58 and 60 are displaced relative to the axes of the television devices 49 and 51 so that the images produced by the three optical systems are superimposed on the ground glass plate 56. Each television device 49 and 51 is associated with a different color so that the colors are combined on the ground glass plate.

Figure 9:
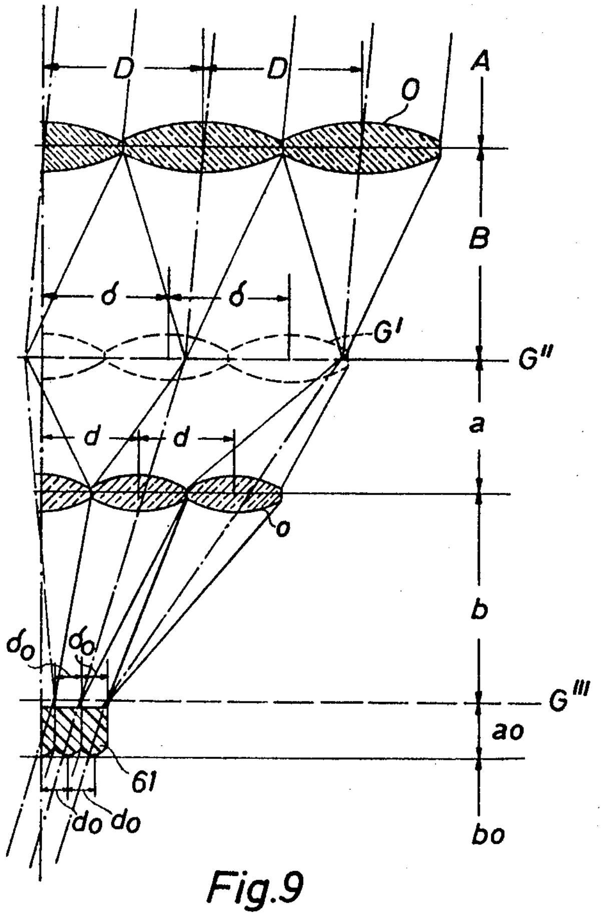
FIG. 9 is a fragmentary schematic view illustrating a modified optical lenticular system according to the invention.

FIG. 9 schematically illustrates a lenticular optical system comprosing three positive lenticular means O, *o* and 61, lenticular means 61 serving as ocular. The lens elements of lenticular means O are spaced distances D, the lens elements of lenticular means G′ are spaced distances $\delta$ the distances between the lens elements of lenticular means *o* are $d$, and the distances between the lens elements of lenticular means 61 are $d_o$. Each lens element of lenticular means 61 has a thickness $\delta_o$.

Lenticular means G′ is located in the intermediate image plane G″, and a second intermediate image is formed in the plane G‴. A, $a$, and $a_o$ are the object distances, and B, $b$, and $b_o$ are the image distances of the three lenticular means.

As is apparent from the drawing, the following equation is valid:

$$\frac{\delta}{d}=\frac{a+b}{b}=\frac{a}{b}+1 \tag{13}$$

The same equation can be established for $\delta_o$, $d_o$, $a_o$, $b_o$.

If the image distance $b$ depending on the object distance $a$ is used in accordance with Equation 7 as a condition for the coinciding of the focal plane, the following equation is obtained:

$$\frac{\delta}{d_o}=\frac{a_o(a_o-f_o)}{a_of_o}+1=\frac{a_o}{f_o} \tag{14}$$

wherein $f_o$ is the focal distance of lenticular means 61.

Figure 10:
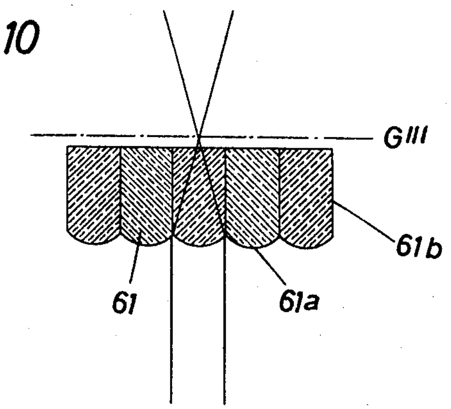
FIG. 10 is a fragmentary sectional view illustrating light guiding means for the optical lenticular system.

From the rays shown in FIG. 9, it is apparent that in addition to light guiding means between lenticular means *o* and the image plane G‴, by which the image formed in the image plane G‴ is limited to an area having the diameter $d_o$, additional light guiding means are necessary in the space $a_o$ which have to be constructed in a particular manner due to the small size of the ocular lens elements of lenticular means 61. One construction of light guiding means is shown in FIG. 10 wherein the ocular lens elements 61 are separate glass rods, each of which has a preferably spherical refracting end face 61*a*, and frosted or ground dull lateral faces 61*b*.

Figure 11:
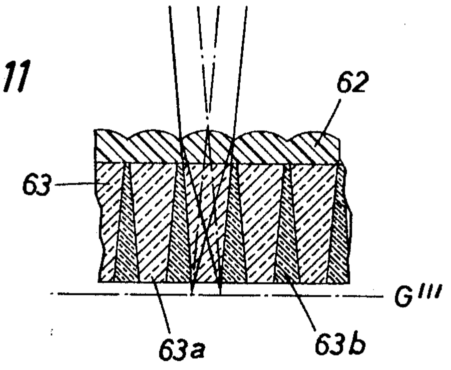
FIG. 11 is a fragmentary sectional view illustrating another light guiding system in accordance with the invention.

Another construction of very small light guiding means is shown in FIG. 11. Between a lenticular means 62, and its image plane G‴, a plane 63 is mounted which consists of a light sensitive glass of the type which after a single exposure and heat treatment, is dulled at the exposed area. When the exposure is suitably directed, the portions 63*b* are less transparent than the portions 63*a* through which the light rays are to be guided. Very accurate guidance and confinement of the bundle of rays can be obtained in this manner.

It will be understood that each of the elements described above, or two or more together, may also find a useful application in other types of lenticular optical systems differing from the types described above.

While the invention has been illustrated and described as embodied in a pair of lenticular means whose lens elements are arranged in such a manner that all image points are located in a common focal plane, it is not intended to be limited to the details shown, since various modifications and structural changes may be made without departing in any way from the spirit of the present invention.

What is claimed as new and desired to be secured by Letters Patent is:

1. A lenticular optical system comprising, in combination, at least two lenticular means, one of said lenticular means being composed of a plurality of first lens elements having optical axes spaced first equal lateral distances from each other, and the other lenticular means being composed of a plurality of second lens elements having optical axes spaced second equal lateral distances from each other, said two lenticular means having principal points spaced from each other along the optical axis of said system a third distance, pairs of first and second lens elements being aligned along axes, respectively, intersecting in a projection center, said first, second, and third distances, and the focal lengths of said first and second lens elements having such a ratio that all said pairs of first and second lens elements form of each object point coinciding image points in an image plane, and so that for an object located at infinity, said projection center is spaced from said image plane the total focal length of the lenticular optical system.

2. A lenticular optical system according to claim 1 wherein the distance L between confronting principal points of said first and second lenticular means is determined by the following equation:

$$L=\frac{fD+Fd}{d\left(1-\frac{F}{A}\right)}$$

wherein D represents said first distance, *d* represents said second distance, F and *f* are the focal distances of said first and second lens elements, respectively; and wherein A represents the distance between the external perspective center of said one lenticular means and an object point, said one lenticular means being located in front, and said other lenticular means being located in the rear of said lenticular optical system.

3. A lenticular optical system according to claim 1 and including a plurality of light guiding means for guiding rays between said first and second lens elements of said pairs, and for preventing rays passing through one pair of lens elements to impinge the lens elements of an adjacent pair.

4. A lenticular optical system according to claim 1, wherein one of said lenticular means confronts the object and has positive power of refraction, and wherein the other lenticular means confronts the image plane and has negative power of refraction.

5. A lenticular optical system according to claim 1 wherein both said lenticular means have positive power of refraction so that the center of projection is located rearwardly of the image plane, and on the side of the same remote from said lenticular means.

6. A lenticular optical system as set forth in claim 1 wherein said two lenticular means are disposed along concentric circles having the common center thereof in the center of projection of said two lenticular means.

7. A lenticular optical system according to claim 6 wherein both said lenticular means have positive power of refraction, and are disposed along concentric circles having the common center thereof in the center of projection of said two lenticular means, and including a source of light located in said center of projection.

8. A lenticular optical system according to claim 7 and including a transparent transporting drum having the axis thereof located in said center of projection, and adapted to support on its surface a film to be projected so that the film is transported during projection along a circular path parallel to said circles.

9. A lenticular optical system according to claim 1 wherein said pairs of lens elements have apertures, focal lengths, and distances from each other selected in accordance with the area of the image plane in which an image portion is formed by the respective pair of lens elements.

10. A lenticular optical system according to claim 1 wherein each of said lens elements has at least two refractive optically corrected surfaces, and wherein each lenticular means includes at least one lenticular screen plate composed of a plurality of said lens elements.

11. A lenticular optical system according to claim 1 wherein at least one of said lenticular means includes two parallel lenticular screen plates respectively consisting of materials having different optical properties.

12. A lenticular optical system according to claim 1 wherein at least one of said lenticular means is at least partly made of a synthetic plastic material having an aspherical refractive image-forming surface.

13. A lenticular optical system according to claim 1, wherein both said lenticular means have positive power of refraction so that the center of projection of the system is located rearwardly of the image plane of the system; and including an additional lenticular means composed of a plurality of lens elements arranged and constructed to operate as field lenses, and being located in the intermediate image plane of said two lenticular means, each lens element of said additional lenticular means being located on an axis connecting a pair of said first and second lens elements to form images of each of the same on the other lens element of the respective pair.

14. A lenticular optical system according to claim 13 and including apertured diaphragm means located in said intermediate image plane and having apertures respectively located on lines connecting first and second lens elements of each pair, said apertures being arranged and constructed to permit the passage of rays forming image sections in the intermediate image plane corresponding to one pair of lens elements, or to an integer multiple of pairs of lens elements, said image sections forming together a complete image.

15. A lenticular optical system according to claim 14 wherein said apertures have straight sides extending parallel to adjacent sides of other apertures so that said image sections are located adjacent each other and form a complete connected image.

16. A lenticular optical system as set forth in claim 1, and including shutter means including at least one diaphragm member and a movable shutter member, each of said members having apertures arranged and spaced in the same pattern as said lens elements so that by operation of said shutter member, apertures for the passage of light rays through pairs of first and second lens elements are opened and closed.

17. A lenticular optical system according to claim 16 wherein the apertures of at least one of said members are square, and wherein said shutter means include means for moving said shutter member parallel to the directions of the diagonals of said square apertures.

18. A lenticular optical system according to claim 16 wherein said shutter means includes two of said diaphragm members, each of said diaphragm members having a plurality of square apertures arranged in the pattern of said lens elements, and means for moving said diaphragm members simultaneously in a direction parallel to the diagonals of said square apertures so that overlapping portions of pairs of square apertures in said two diaphragm members form square openings having a variable area.

19. A lenticular optical system according to claim 16 wherein said shutter means include a plurality of cranks connected with said shutter member for moving the same in a circular translatory movement so that said apertures in said shutter member register with said apertures in said diaphragm members during the translatory movement of said shutter member.

20. A lenticular optical system according to claim 19 wherein said apertures of said shutter member are arranged in same pattern as said apertures of said diaphragm member, and wherein the effective radius of said cranks is half the distance between adjacent apertures of said diaphragm member.

21. A lenticular optical system according to claim 20 wherein said apertures in said diaphragm member and in said shutter member are arranged in crossing rows, and wherein said shutter member has one row of apertures more than said diaphragm member.

22. A lenticular optical system according to claim 1 in combination with means for supporting a photographic film in the image of plane of said system; and means for moving at least one of said lenticular means toward and away from said supporting means and said film.

23. A lenticular optical system according to claim 1 and including a third lenticular means composed of a plurality of lens elements respectively associated with said pairs of first and second lens elements and being located rearwardly of the same; and wherein the distance between the image sections produced by said pairs of first and second lens elements divided by the distance between said lens elements of said third lenticular means is equal to the object distance of said third lenticular means divided by the focal length of said third lenticular means.

24. A lenticular optical system according to claim 23 wherein said third lenticular means constitute the ocular means of field glasses so that said ocular means consists of a plurality of lens elements.

25. A lenticular optical system according to claim 1 and including a plurality of diaphragms located between said two lenticular means, and spacing members between said diaphragms, said diaphragms being thin sheets having apertures registering in the direction of rays passing through pairs of first and second lens elements, and said spacing means having openings larger than said apertures so that the light rays are guided between said first and second lens elements of each pair by said apertures.

26. A lenticular optical system according to claim 1 including a lenticular means composed of parallel glass fiber rods forming said lens elements, each of said fiber rods having a curved end face having refractive power and frosted lateral faces for guiding light rays in longitudinal direction of said fiber rods.

27. A lenticular optical system according to claim 1 and including a lenticular means consisting of a glass sensitive to light and heat to become dull, and having dull portions and transparent portions for guiding the light.

28. A lenticular optical system according to claim 1 and including a neutral planar glass plate covering at least one of said lenticular means 29. A photographic camera comprising, in combination, housing means, an objective including at least two lenticular means mounted in said housing means, one of said lenticular means being composed of a plurality of first lens elements having optical axes spaced first equal lateral distances from each other, and the other lenticular means being composed of a plurality of second lens elements having optical axes spaced second equal lateral distances from each other, said two lenticular means having principal points spaced from each other along the optical axis of said system a third distance, pairs of said first and second lens elements being aligned along axes, respectively, intersecting in a projection center, said first, second and third distances, and the focal lengths of said first and second lens elements having a ratio that all said pairs of first and second lens elements form of each object point coinciding image points in an image plane, and so that for an object located at infinity, said projection center is spaced from said image plane the total focal length of said objective; a support in said housing means for supporting a photographic film in said image plane; shutter means between at least one of said lenticular means and said support; and means for placing said two lenticular means at a selected third distance from each other.

30. A photographic camera as claimed in claim 29 wherein one of said lenticular means confronts the object and has first lens elements having positive power of refraction, and wherein the other lenticular means confront said support and has second lens elements having negative power of refraction whereby said projection center is located in front of said one lenticular means of said objective.

31. A photographic camera as claimed in claim 29 and including a diaphragm means having apertures respectively located in the axes of said pairs of first and second elements; and wherein said shutter has openings respectively cooperating with said apertures and is movable to open and close the same.

References Cited

UNITED STATES PATENTS

| | | | |
|---|---|---|---|
| 1,549,579 | 8/1925 | Lenouvel. | |
| 1,882,829 | 10/1932 | Hall. | |
| 2,131,974 | 10/1938 | Genies | 350—128 |
| 2,154,868 | 4/1939 | Genies | 350—128 |
| 2,186,203 | 1/1940 | Centreno | 350—272 |
| 2,749,794 | 6/1956 | O'Leary | 350—276 |
| 2,736,235 | 2/1956 | Toulon | 350—167 X |
| 3,178,993 | 4/1965 | Ferris et al. | 350—167 |
| 3,221,591 | 12/1965 | Schepler. | |

JOHN K. CORBIN, *Primary Examiner.*

U.S. Cl. X.R.

95—53; 350—96, 127, 167, 213, 272; 353—30